United States Patent [19]
Saito et al.

[11] Patent Number: 5,898,736
[45] Date of Patent: Apr. 27, 1999

[54] DATA RECEIVING SYSTEM

[75] Inventors: Yoshiko Saito, Kamakura; Mitsuru Uesugi, Yokohama, both of Japan

[73] Assignee: Matsushita Electric Industrial Co., Ltd., Osaka, Japan

[21] Appl. No.: 08/729,747

[22] Filed: Oct. 7, 1996

[30]  Foreign Application Priority Data

Dec. 13, 1995 [JP] Japan .................................. 7-346323

[51] Int. Cl.⁶ .............................. H03K 9/00; H04L 27/06; H04L 27/14; H04L 27/22
[52] U.S. Cl. .......................................................... 375/316
[58] Field of Search .................... 375/316, 229, 375/341; 455/68, 515

[56]  References Cited

U.S. PATENT DOCUMENTS

| | | | |
|---|---|---|---|
| 4,596,024 | 6/1986 | Thomson | 375/100 |
| 5,297,169 | 3/1994 | Backstrom et al. | 375/13 |
| 5,341,401 | 8/1994 | Farjh et al. | 375/94 |
| 5,384,782 | 1/1995 | Elms | 371/2.1 |
| 5,499,246 | 3/1996 | Cooper | 370/345 |
| 5,575,851 | 11/1996 | Saegusa | 375/29 |

FOREIGN PATENT DOCUMENTS 5259960  10/1993  Japan .

*Primary Examiner*—Stephen Chin
*Assistant Examiner*—Mohammad Ghayour
*Attorney, Agent, or Firm*—Pollock, Vande Sande & Amernick

[57]  ABSTRACT

The data receiving system comprises a detecting section (13, 23, 33, 44, 54, 64, 75) for detecting an information field such as a flag indicating the identity of a control channel (FACCH) data when there are a plurality of information fields each indicating the identity of a received radio channel, and judging section (14, 25, 35, 46, 56, 66, 77) for determining the received radio channel based on the detection result of the detecting section.

3 Claims, 5 Drawing Sheets

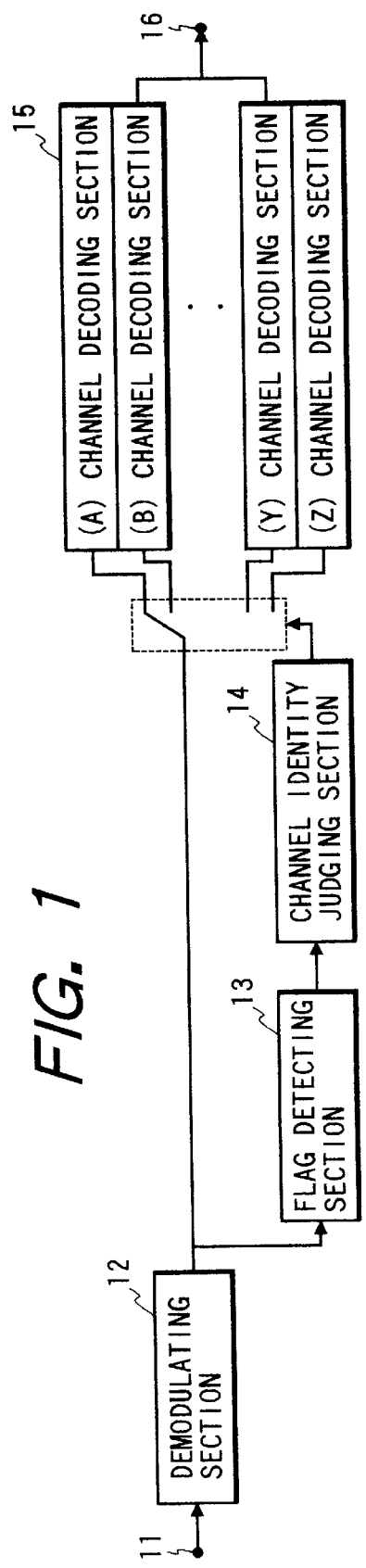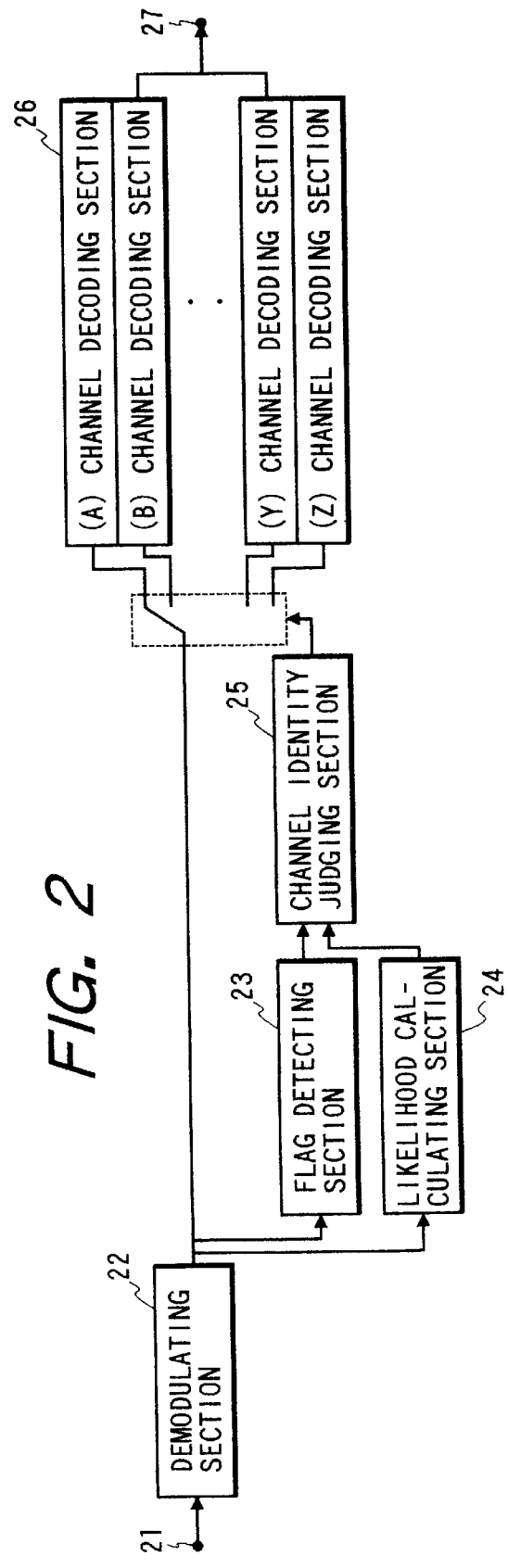

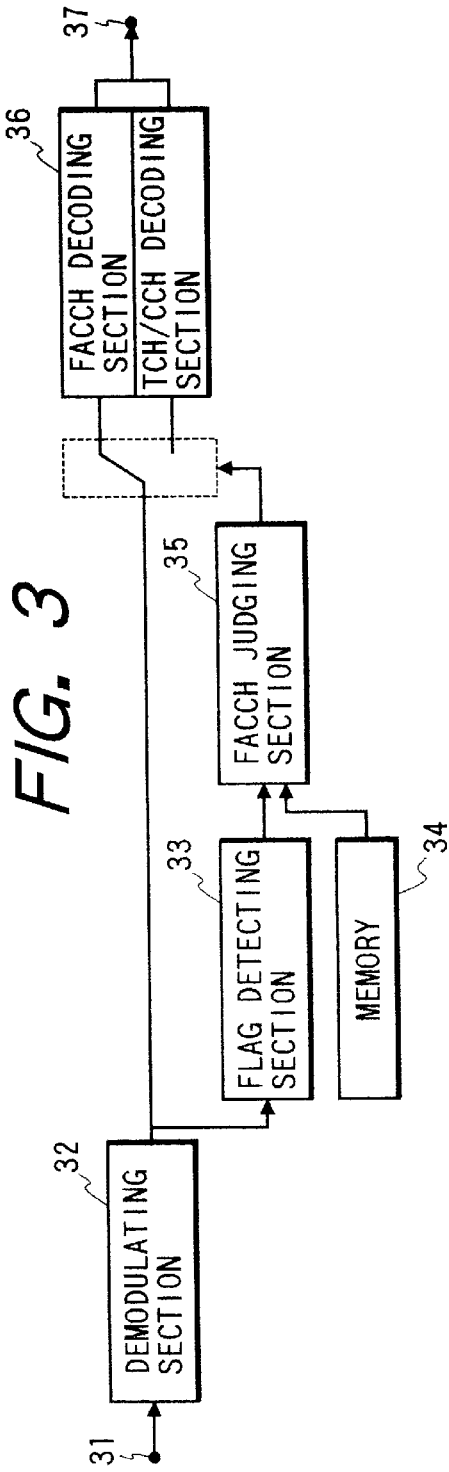
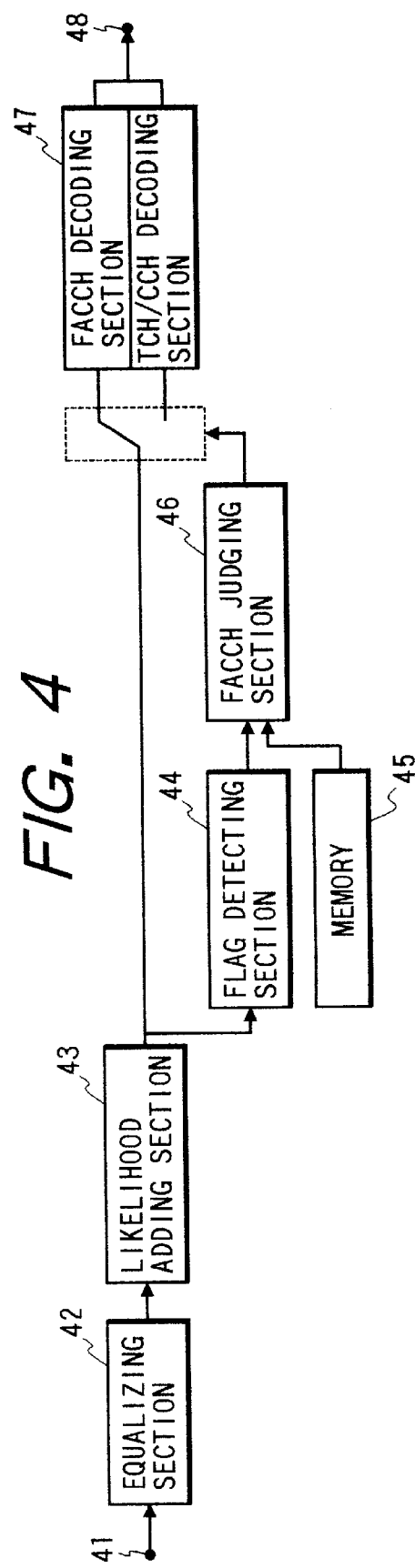

DATA RECEIVING SYSTEM

BACKGROUND OF THE INVENTION

1. Field of the Invention

This invention generally relates to a data receiving system preferably used for digital mobile communications, and more particularly to a data receiving system capable of accurately detecting a control channel (FACCH) with reduced processing or computation amount.

2. Prior Art

In the mobile communication systems transmission/reception of various radio channels (including so-called control channels CCH as well as speech/data channels TCH) is essential for the "establishment of calling" and realization of "speech communications" and "data communications." One format example for radio channels used in the mobile communications is FIG. 8 which shows a data format applicable to the GSM system, while FIG. 9 shows another data format applicable to the PHS system.

For example, during "speech communications", there is a possibility that a mobile station shifts from the present cell to a neighboring cell. In such a cases a base station performs the processing for causing the speech channel to carry a so-called control channel FACCH thereon (hereinafter, this processing is referred to as "steal") and for transmitting a handover message to the mobile station.

In this manner, the control channel (FACCH) is an important channel in the start-up stage of the processing, for example for preventing the reception quality of the mobile station from being undesirably deteriorated (or preventing disconnecting of the call). Hence, failure in detecting the control channel (FACCH) will possibly result in a fatal failure in the continuation of the communications.

In view of the above, to increase the detection accuracy of control channel (FACCH), the following detecting method (Unexamined Japanese Patent application No. HEI 5-259960) has been already proposed. An operation of this conventional channel detecting method will be explained in greater detail with reference to the flow chart of FIG. 10.

It is supposed that the control channel (FACCH) and speech channel (UCH) are coded with different coding rates (R1 and R2) in a transmitter. When a receiver receives a data block coded in this manners the following processing is performed.

Step 1. A total of j nodes are decoded in accordance with the Viterbi algorithm as though the received data block itself or part of the same were a control channel (FACCH) block;

Step 2. The smallest accumulated metric $m1=(mj)_{min}$ is determined after decoding of the j nodes. A threshold value T1 and a further threshold value T2 are predetermined by simulations, so as to obtain a minimum error probability;

Step 3. The value m1 is then compared with the threshold value T1;

Step 4. If m1<T1 ("No" in the judgement), this implies that the data received can be definitely considered to be the control channel (FACCH) data, and therefore the control channel (FACCH) data block is decoded;

Step 5. The value of m1 is stored when m1>T1 ("Yes" in the judgement) and the received data block is decoded as though it were a speech (UCH) data block. In this cases decoding can be executed with nodes k in accordance with the Viterbi algorithm;

Step 6. A new smallest value m2 of the accumulated metric $m_k$ is obtained, i.e. $m2=(m_k)_{min}$;

Step 7. A difference (m1−m2) is compared with the second threshold T2;

Step 8. If (m1−m2)<T2 ("No" in the judgement), the data block is considered to be a control channel (FACCH) block and is decoded as control channel (FACCH) block; and Step 9. If (m1−m2)>T2 ("Yes" in the judgement), the data block is considered to be a speech channel (UCH) block and is decoded as speech channel (FACCH) block.

In this manner, according to the conventional data receiving system, the decoding processing is performed according to the Viterbi algorithm as through the received data were a control channel (FACCH) data. Then, using the smallest accumulated metric, the control channel (FACCH) is accurately detected and decoded.

However, this conventional data receiving system is disadvantageous in that the processing or computation amount is greatly increased because the decoding processing of the received data needs to be performed as control channel (FACCH) data in accordance with Viterbi algorithm in response to every decoding timing signal.

SUMMARY OF THE INVENTION

Accordingly, in view of the above-described problems encountered in the prior art, a principal object of the present invention is to provide a novel and excellent data receiving system which utilizes the information available from a conventionally existing function and is capable of detecting a control channel (FACCH) data accurately without increasing processing or accumulation amount.

In order to accomplish this and other related objects, the present invention provides a data receiving system having various aspects which will be explained hereinafter together with reference numerals in parentheses which show the correspondence to the components of the preferred embodiments of the present invention described later.

The data receiving system of the present invention comprises a detecting means (13, 23, 33, 44, 54, 64, 75) for detecting an information field within a predetermined decoding unit which is a minimum unit capable of decoding received data when there are a plurality of information fields each indicating the identity of a received radio channel, and judging means (14, 25, 35, 46, 56, 66, 77) for determining the received radio channel based on the detection result of the detecting means.

According to one aspect of the present invention, the judging means (14) determines the received radio channel using the decision by majority.

According to a second aspect of the present invention, the judging means (24, 25) temporarily storing the probability of the content detected by the detecting means (23) with reference to likelihood information corresponding to the content, adding the probability when the same content is detected again, and finally determining a most probable radio channel corresponding to the received data based on the probability stored.

According to a third aspect of the present invention, the detecting means (33) detects a flag indicating the identity of a control channel (FACCH) data, and the judging means (35) identifies a received radio channel as a control channel (FACCH) when the number of flags thus detected is larger than a predetermined judgement discriminating value stored in a memory (34) and identifying the received radio channel as another channel other than the control channel (FACCH) when the number of flags is smaller than the judgement discriminating value.

According to a fourth aspect of the present invention, there is provided equalizing means (42) for correcting a reception signal to eliminate distortion or the like and generating an equalized output signal, wherein the detecting means (44) detects a flag indicating the identity of a control channel (FACCH) data involved in the equalized output signal, and the judging means (46) identifies a received radio channel as a control channel (FACCH) when the number of flags thus detected is larger than a predetermined judgement discriminating value stored in a memory (45) and identifying the received radio channel as another channel other than the control channel (FACCH) when the number of flags is smaller than the judgement discriminating value.

According to a fifth aspect of the present invention, there is provided equalizing means (52) for correcting a reception signal to eliminate distortion or the like and generating an equalized output signal. The detecting means (54) detects a flag indicating the identity of a control channel (FACCH) data involved in the equalized output signal, and the judging means (56) calculates the probability of each flag using likelihood information of equalized data added by likelihood adding means (53). A received radio channel is identified as a control channel (FACCH) when the probability thus calculated is larger than a predetermined judgement discriminating value. The received radio channel is identified as another channel other than the control channel (FACCH) when the probability is smaller than the judgement discriminating value.

According to a sixth aspect of the present invention, there is provided equalizing means (62) for correcting a reception signal to eliminate distortion or the like and generating an equalized output signal. The detecting means (64) detects a flag indicating the identity of a control channel (FACCH) data involved in the equalized output signals and the judging means (56) identifies a received radio channel as a control channel (FACCH) when the number of flags thus detected is larger than a first judgement discriminating value (Memory 1). The received radio channel is identified as another channel other than the control channel (FACCH) when the number of flags is smaller than a second discriminating value (Memory 2). Furthermore, the judging means (66) calculates the probability of each flag using likelihood information of equalized data added by likelihood adding means (63) when the number of flags is somewhere between the first and second judgement discriminating values. A received radio channel is identified as the control channel (FACCH) when the probability thus calculated is larger than a third judgement discriminating value (Memory 3). The received radio channel is identified as another channel other than the control channel (FACCH) when the probability is smaller than the third discriminating value.

Furthermore, according to a seventh aspect of the present invention, there is provided equalizing means (73) for correcting a reception signal to eliminate distortion or the like and generating an equalized output signal. Bypassing means (78) establishes a signal transmission path bypassing the detecting means and the judging means, wherein the detecting means (75) detects a flag indicating the identity of a control channel (FACCH) data involved in the equalized output signal. The judging means (77) calculates the probability of each flag using likelihood information of equalized data added by likelihood adding means (74) and then identifies a received radio channel as a control channel (FACCH) when the probability thus calculated is larger than a predetermined judgement discriminating value stored in a memory (76). The received radio channel is identified as another channel other than the control channel (FACCH) when the probability is smaller than the judgement discriminating value, whereby the reception signal is decoded as a control channel (FACCH) data without being subjected to the processing for detecting the flag. The received radio channel is judged when a reception mode is beforehand known as an exclusive mode for receiving the control channel (FACCH).

BRIEF DESCRIPTION OF THE DRAWINGS

The above and other objects, features and advantages of the present invention will become more apparent from the following detailed description which is to be read in conjunction with the accompanying drawings, in which:

FIG. 1 is a schematic block diagram showing an arrangement of a data receiving system in accordance with a first embodiment of the present invention;

FIG. 2 is a schematic block diagram showing an arrangement of a data receiving system in accordance with a second embodiment of the present invention;

FIG. 3 is a schematic block diagram showing an arrangement of a data receiving system in accordance with a third embodiment of the present invention;

FIG. 4 is a schematic block diagram showing an arrangement of a data receiving system in accordance with a fourth embodiment of the present invention;

DETAILED DESCRIPTION OF THE PREFERRED EMBODIMENTS

Figure 5:
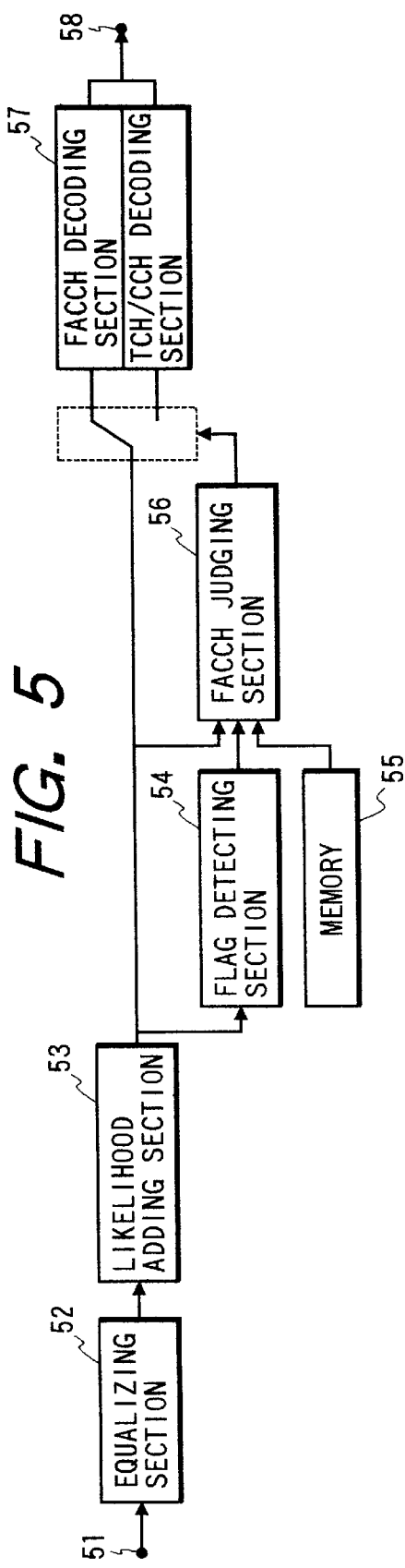
FIG. 5 is a schematic block diagram showing an arrangement of a data receiving system in accordance with a fifth embodiment of the present invention.

Hereinafter, preferred embodiments of the present invention will be explained with reference to the accompanying drawings.

FIG. 1 is a schematic block diagram showing an arrangement of a data receiving system in accordance with a first embodiment of the present invention. In FIG. 1, a reception signal is entered through an input terminal 11 to a demodulating section 12. A flag detecting section 13 receives the demodulated signal from demodulating section 12 and detects a flag (information bit) indicating the identity of channel. A channel identity judging section 14, connected to flag detecting section 13, makes a judgement as to the identity of the channel depending on the content of the flag detected by flag detecting section 13. A channel decoding section 15, connected to both a demodulating section 12 and channel identity judging section 14, executes a switching operation for selecting one of channel decoding sections (A) through (Z) in accordance with the output of channel identity judging section 14, thereby channel decoding the demodulation signal sent from demodulating section 12. Then, the modulation signal thus channel decoded is output from an output terminal 16.

Next, an operation of the above-described first embodiment will be explained. In this first embodiment, when the reception signal is entered through input terminal 11, the reception signal is first demodulated by demodulating section 12. Flag detecting section 13 detects the flag (information bit) indicating the identity of radio channel from the reception signal demodulated by demodulating section 12, about several frames preceding the demodulating timing signal. For example, when data is distributed to several frames by interleave or the like, these several frames are subjected to the above-described flag detection at a time. These several frames, as a unit, are hereinafter referred to as "decoding frame unit". Channel identity judging section 14 judges the identity of channel corresponding to the content of the flag detected by flag detecting section 13 (information bit). For example, a control channel (FACCH) data is detectable from the content of the flag. Channel identity judging section 14 determines the identity of the channel according to the decision by majority. Channel decoding section 15 performs the channel decoding operation based on the judgement result of channel identity judging section 14. The signal thus channel decoded is then output from output terminal 16.

In this manner, the first embodiment of the present invention makes it possible to greatly reduce the processing or computation amount compared with the conventional method of judging the control channel (FACCH) data which basically uses Viterbi algorithm in response to each demodulation timing signal.

FIG. 2 is a schematic block diagram showing an arrangement of a data receiving system in accordance with a second embodiment of the present invention. In FIG. 2, a reception signal is entered through an input terminal 21 to a demodulating section 22. A flag detecting section 23 receives the demodulated signal from the demodulating section 22 and detects a flag (information bit) indicating the identity of the channel.

A likelihood calculating section 24 receives the demodulated signal from demodulating section 22 and calculates the likelihood of the demodulating signal. A channel identity judging section 25, connected to both the flag detecting section 23 and the likelihood calculating section 24, judges the probability of channel depending on the content of the flag detected by flag detecting section 23 and the likelihood calculated by the likelihood calculating section 24 at this moment.

A channel decoding section 26, connected to both the demodulating section 22 and channel identity judging section 25, executes a switching operation for selecting one of channel decoding sections (A) through (Z) in accordance with the output of channel identity judging section 25, thereby channel decoding the demodulation signal sent from demodulating section 22. Then, the modulation signal thus channel decoded is output from an output terminal 27.

Next, an operation of the above-described second embodiment will be explained. In this second embodiment, when the reception signal is entered through input terminal 21, the reception signal is first demodulated by demodulating section 22. Flag detecting section 23 detects the flag (information bit) indicating the identity of radio channel from the reception signal demodulated by demodulating section 22, about several frames designated by the decoding frame unit.

Likelihood calculating section 24 calculates the likelihood of each signal demodulated by demodulating section 22. Channel identity judging section 25 adds the likelihood to each detected radio channel based on the content of the flag (information bit) detected by flag detecting section 23 and the likelihood calculated by likelihood calculating section 24.

Channel identity judging section 25 judges the identity of channel considering the probability of the channel identity finally obtained. Thus, the control channel (FACCH) data is detectable from the channel identity finally obtained. Channel decoding section 26 performs the channel decoding operation based on the judgement result of channel identity judging section 25. The signal thus channel decoded is then output from output terminal 27.

In this manners the second embodiment of the present invention makes it possible to greatly reduce the processing or computation amount compared with the conventional method of judging the control channel (FACCH) data which basically uses Viterbi algorithm in response to each demodulation timing signal. Furthermore, the second embodiment calculates the likelihood of the detected flag and judges the channel of the received radio channel. Hence, the accuracy in the judgement can be greatly increased.

FIG. 3 is a schematic block diagram showing an arrangement of a data receiving system in accordance with a third embodiment of the present invention. In FIG. 3, a reception signal is entered through an input terminal 31 to a demodulating section 32. A flag detecting section 33 receives the demodulated signal from demodulating section 32 and detects a flag (information bit) indicating the control channel (FACCH) data.

A memory 34 stores a threshold value which is used for detecting the control channel (FACCH) data. An FACCH judging section 35, connected to both the flag detecting section 33 and memory 34, makes a judgement as to whether the flag content detected by flag detecting section 33 is the control channel (FACCH) data or not.

A channel decoding section 36, connected to both the demodulating section 32 and FACCH judging section 35, executes a switching operation for selecting either an FACCH decoding section or a TCH/CCH decoding section in accordance with the output of FACCH judging section 35, thereby channel decoding the demodulation signal sent from demodulating section 32. Then, the modulation signal thus channel decoded is output from an output terminal 37.

Next, an operation of the above-described third embodiment will be explained. In this third embodiment, when the reception signal is entered through input terminal 31, the reception signal is first demodulated by demodulating section 32. Flag detecting section 33 detects the flag (information bit) indicating the identity of control channel (FACCH) data from the reception signal demodulated by demodulating section 32, about several frames designated by the decoding frame unit.

FACCH judging section 35 counts up a predetermined parameter when the content of the flag (information bit) detected by flag detecting section 33 involves the control channel (FACCH) data. Then, FACCH judging section 35 identifies the received radio channel as a control channel (FACCH) when the count-up value exceeds the threshold value and otherwise as another channel.

Channel decoding section 36 performs the channel decoding operation based on the judgement result of FACCH judging section 35. The signal thus channel decoded is then output from output terminal 37.

In this manner, the third embodiment of the present invention makes it possible to greatly reduce the processing or computation amount compared with the conventional method of judging the control channel (FACCH) data which basically uses Viterbi algorithm in response to each demodulation timing signal. Furthermore, the third embodiment exclusively judges the control channel (FACCH) data. Hence, the load required for the judgement processing can be largely reduced.

FIG. 4 is a schematic block diagram showing an arrangement of a data receiving system in accordance with a fourth embodiment of the present invention. In FIG. 4, a reception signal is entered through an input terminal 41 to an equalizing section 42. A likelihood adding section 43 is connected to equalizing section 42. Equalizing section 42 corrects distortion or the like of the reception signal and generates an equalized output signal. Likelihood adding section 43 adds a predetermined likelihood to each equalized output signal. A flag detecting section 44, connected to the likelihood adding section 43, detects a flag (information bit) indicating the identity of the control channel (FACCH) data by checking the signal having been added the likelihood adding section. A memory 45 stores a threshold value which is used for detecting the control channel (FACCH) data. An FACCH judging section 46, connected to both the flag detecting section 44 and memory 45, makes a judgement as to whether the flag content detected by flag detecting section 44 is the control channel (FACCH) data or not, referring to the threshold value stored in memory 45.

A channel decoding section 47, connected to both of likelihood adding section 43 and FACCH judging section 46, executes a switching operation for selecting either an FACCH decoding section or a TCH/CCH decoding section in accordance with the output of FACCH judging section 46, thereby channel decoding the signal sent from likelihood adding section 43 which is corrected in equalizing section 42 to eliminate distortion or the like and is added the likelihood in likelihood adding section 43. Then, the signal thus channel decoded is output from an output terminal 48.

Next, an operation of the above-described fourth embodiment will be explained. In this fourth embodiment, when the reception signal is entered through input terminal 41, equalizing section 42 corrects the reception signal to eliminate the distortion or the like thereof and generates an equalized output signal. Likelihood adding section 43 adds a predetermined likelihood to the reception signal sent from the equalizing section 42.

Flag detecting section 44 detects the flag (information bit) indicating the control channel. (FACCH) data from the reception signal when the reception signal is sent from the likelihood adding section 43, about several frames designated by the decoding frame unit.

FACCH judging section 46 counts up a predetermined parameter when the content of the flag (information bit) detected by flag detecting section 44 involves the control channel (FACCH) data. Then, FACCH judging section 46 identifies the received radio channel as control channel (FACCH) when the count-up value exceeds the threshold value stored in memory 45 and otherwise as another channel.

Channel decoding section 47 performs the channel decoding operation based on the judgement result of FACCH judging section 46. The signal thus channel decoded is then output from output terminal 48.

In this manners the fourth embodiment of the present invention makes it possible to greatly reduce the processing or computation amount compared with the conventional method of judging the control channel (FACCH) data which basically uses Viterbi algorithm in response to each demodulation timing signal. Furthermore, the fourth embodiment performs the equalizing processing to eliminate the distortion or the like of the reception signal. Hence, the judgement can be accurately performed.

FIG. 5 is a schematic block diagram showing an arrangement of a data receiving system in accordance with a fifth embodiment of the present invention. In FIG. 5, a reception signal is entered through an input terminal 51 to an equalizing section 52. A likelihood adding section 53 is connected to equalizing section 52. Equalizing section 52 corrects distortion or the like of the reception signal and generates an equalized output signal. Likelihood adding section 53 adds a predetermined likelihood to each equalized output signal.

A flag detecting section 54, connected to the likelihood adding section 53, detects a flag (information bit) indicating the identity of the control channel (FACCH) data by checking the signal having been added to the likelihood adding section. A memory 55 stores a threshold value which is used for detecting the control channel (FACCH) data. An FACCH judging section 56, connected to each of likelihood adding section 53, flag detecting section 54 and memory 55, makes a judgement as to whether the flag content detected by flag detecting section 54 is the control channel (FACCH) data or not.

A channel decoding section 57, connected to both of likelihood adding section 53 and FACCH judging section 56, executes a switching operation for selecting either an FACCH decoding section or a TCH/CCH decoding section in accordance with the output of FACCH judging section 56, thereby channel decoding the signal sent from likelihood adding section 53 which is corrected in equalizing section 52 to eliminate distortion or the like and is added the likelihood in likelihood adding section 53. Then, the signal, thus channel decoded, is output from an output terminal 58.

Next, an operation of the above-described fifth embodiment will be explained. In this fifth embodiment, when the reception signal is entered through input terminal 51, equalizing section 52 corrects the reception signal to eliminate the distortion or the like thereof and generates an equalized output signal. Likelihood adding section 53 adds a predetermined likelihood to the reception signal sent from the equalizing section 52.

Flag detecting section 54 detects the flag (information bit) indicating the control channel (FACCH) data from the reception signal when the reception signal is sent from the likelihood adding section 53, about several frames designated by the decoding frame unit.

FACCH judging section 56 sums up the likelihood corresponding to the flag (information bit) when the content of the flag (information bit) detected by flag detecting section 54 involves the control channel (FACCH) data. On the other hand, FACCH judging section 56 subtracts the likelihood corresponding to the flag (information bit) from the sum-up value when the content of the flag (information bit) does not involve the control channel (FACCH) data. Then, FACCH judging section 56 identifies the received radio channel as control channel (FACCH) when the sum-up value exceeds the threshold value stored in memory 55 and otherwise as another channel.

Channel decoding section 57 performs the channel decoding operation based on the judgement result of FACCH judging section 56. The signal thus channel decoded is then output from output terminal 58.

In this manner, the fifth embodiment of the present invention uses the information conventionally used, nevertheless makes it possible to perform the judgement without increasing the processing or computation amount compared with the conventional method of judging the control channel (FACCH) data which basically uses Viterbi algorithm in response to each demodulation timing signal. Furthermore, the fifth embodiment sums up and subtracts the likelihood to the detected flag. Hence, the judgement can be accurately performed by taking account of the probability of the flag.

Figure 6:
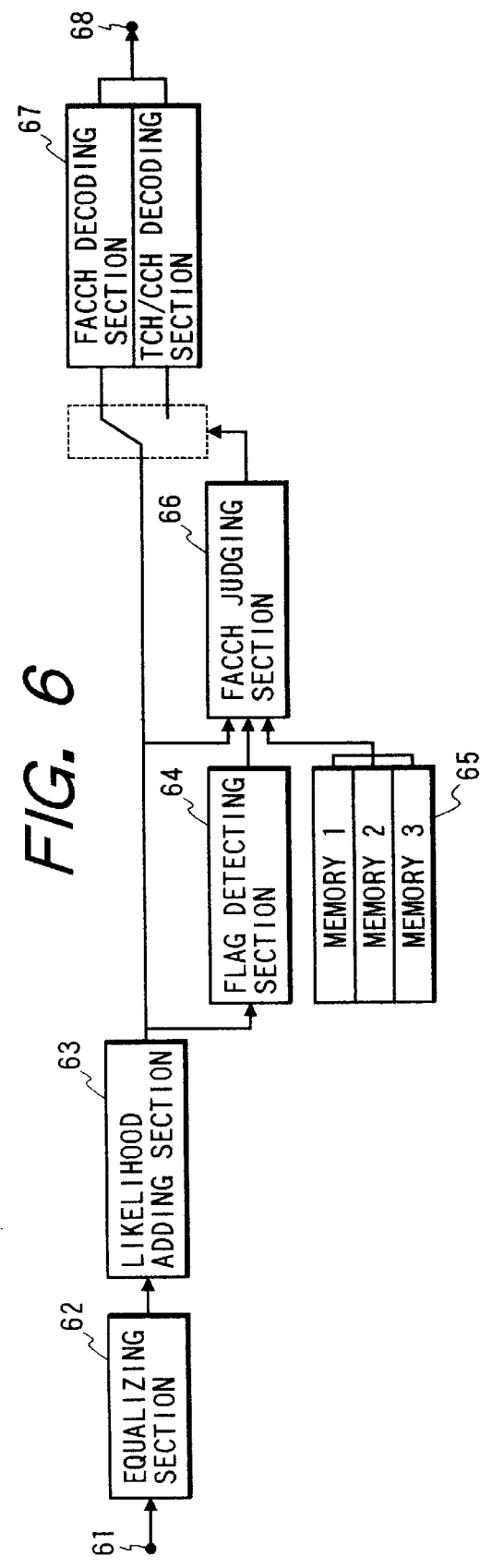
FIG. 6 is a schematic block diagram showing an arrangement of a data receiving system in accordance with a sixth embodiment of the present invention.

FIG. 6 is a schematic block diagram showing an arrangement of a data receiving system in accordance with a sixth embodiment of the present invention. In FIG. 6, a reception signal is entered through an input terminal 61 to an equalizing section 62. A likelihood adding section 63 is connected to equalizing section 62. Equalizing section 62 corrects distortion or the like of the reception signal and generates an equalized output signal. Likelihood adding section 63 adds a predetermined likelihood to each equalized output signal.

A flag detecting section 64, connected to the likelihood adding section 63, detects a flag (information bit) indicating the identity of the control channel (FACCH) data by checking the signal having been added by the likelihood adding section. A memory 65 includes three memories 1 to 3 each storing a threshold value which is used for detecting the control channel (FACCH) data. An FACCH judging section 66, connected to each of likelihood adding section 63, flag detecting section 64 and memory 65, makes a judgement as to whether the flag content detected by flag detecting section 64 is the control channel (FACCH) data or not.

A channel decoding section 67, connected to both of likelihood adding section 63 and FACCH judging section 66, executes a switching operation for selecting either an FACCH decoding section or a TCH/CCH decoding section in accordance with the output of FACCH judging section 66, thereby channel decoding the signal sent from likelihood adding section 63 which is corrected in equalizing section 62 to eliminate distortion or the like and is added the likelihood signal in likelihood adding section 63. Then, the signal thus channel decoded is output from an output terminal 68.

Next, an operation of the above-described sixth embodiment will be explained. In this sixth embodiment, when the reception signal is entered through input terminal 61, equalizing section 62 corrects the reception signal to eliminate the distortion or the like thereof and generates an equalized output signal. Likelihood adding section 63 adds a predetermined likelihood signal to the reception signal sent from the equalizing section 62.

Flag detecting section 64 detects the flag (information bit) indicating the control channel (FACCH) data from the reception signal when the reception signal is sent from the likelihood adding section 63, about several frames designated by the decoding frame unit.

FACCH judging section 66 counts up a predetermined parameter when the content of the flag (information bit) detected by flag detecting section 64 involves the control channel (FACCH) data. Then, FACCH judging section 66 identifies the received radio channel as control channel (FACCH) when the count-up value is larger than threshold value 1 stored in memory 65, and identifies as another channel when the count-up value is smaller than threshold value 2.

Furthermore, when the count-up value is somewhere between threshold value 1 and threshold value 2, FACCH judging section 66 performs the judging operation in the following manner using the result of likelihood adding section 63 and flag detecting section 64.

FACCH judging section 66 sums up the likelihood corresponding to the flag (information bit) when the content of the flag (information bit) detected by flag detecting section 64 involves the control channel (FACCH) data, and subtracts the likelihood corresponding to the flag (information bit) from the sum-up value when the content of the flag (information bit) does not involve the control channel (FACCH) data. Then, FACCH judging section 66 identifies the received radio channel as control channel (FACCH) when the sum-up value exceeds threshold value 3 stored in memory 65 and otherwise as another channel.

Channel decoding section 67 performs the channel decoding operation based on the judgement result of FACCH judging section 66. The signal thus channel decoded is then output from output terminal 68.

In this manners the sixth embodiment of the present invention uses the information conventionally used, nevertheless makes it possible to perform the judgement without increasing the processing or computation amount compared with the conventional method of judging the control channel (FACCH) data which basically uses a Viterbi algorithm in response to each demodulation timing signal. Furthermore, the sixth embodiment uses a plurality of threshold values which increase the accuracy in the judgement.

Figure 7:
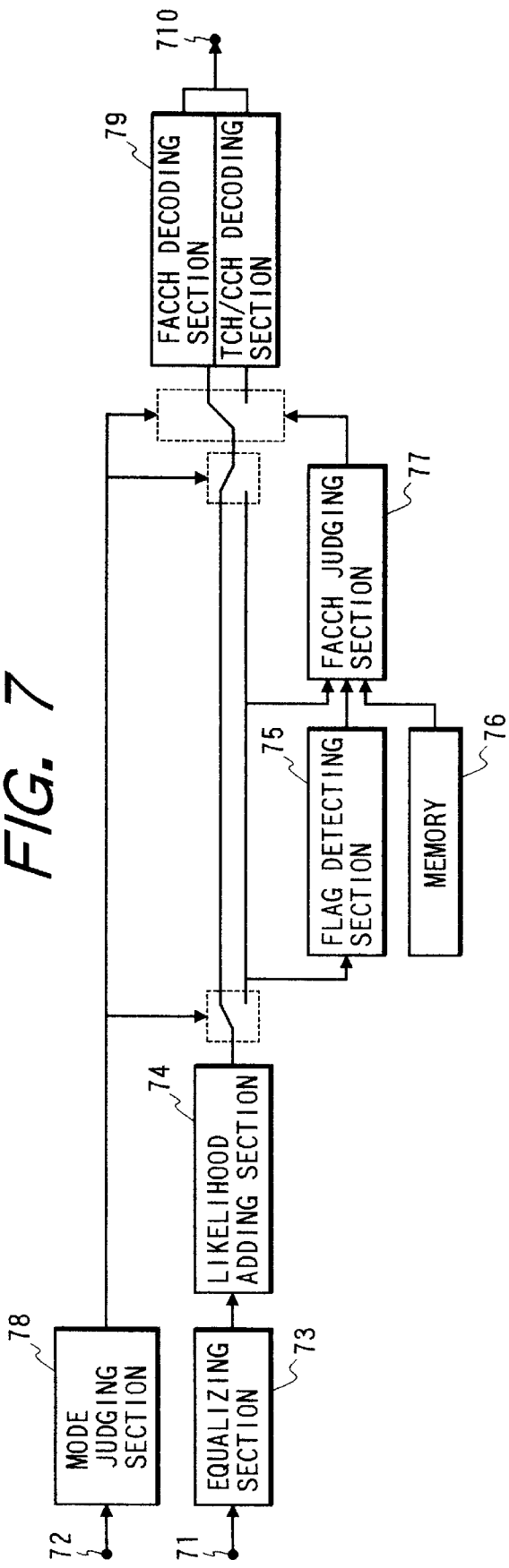
FIG. 7 is a schematic block diagram showing an arrangement of a data receiving system in accordance with a seventh embodiment of the present invention.
Figure 8:
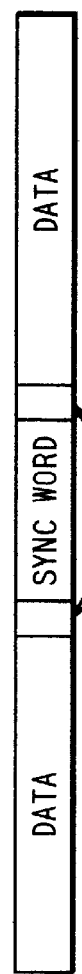
FIG. 8 is a view showing an example of data format for a conventional GSM system.
Figure 9:
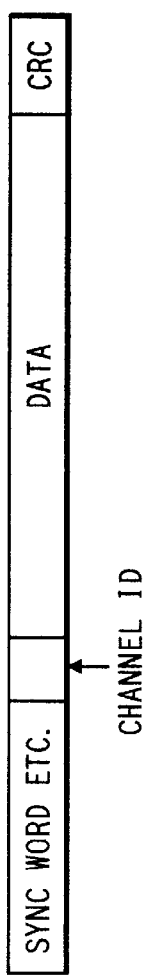
FIG. 9 is a view showing an example of data format for a conventional PHS system.
Figure 10:
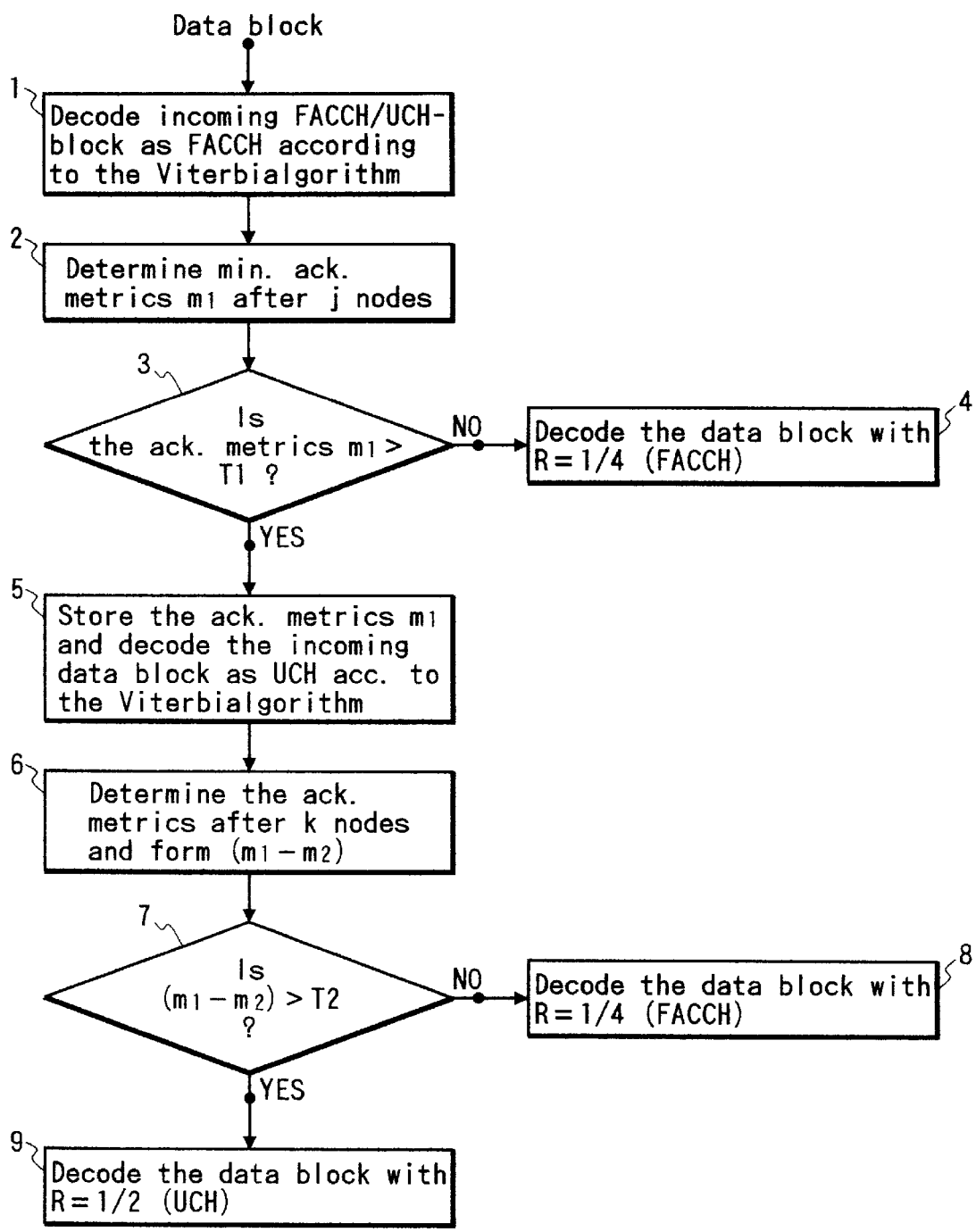
FIG. 10 is a flow chart showing an operation of a conventional data receiving system.

FIG. 7 is a schematic block diagram showing an arrangement of a data receiving system in accordance with a seventh embodiment of the present invention. In FIG. 7, a reception signal is entered through an input terminal 71 to an equalizing section 73. There is another input terminal 72 connected to CPU or the like to receive control information or the like from the same. A likelihood adding section 74 is connected to equalizing section 73. Equalizing section 73 corrects distortion or the like of the reception signal and generates an equalized output signal. Likelihood adding section 74 adds a predetermined likelihood to each equalized output signal.

A flag detecting section 75, connected to the likelihood adding section 74, detects a flag (information bit) indicating the identity of the control channel (FACCH) data by checking the signal having been added by the likelihood adding section. A memory 76 stores a threshold value which is used for detecting the control channel (FACCH) data. An FACCH judging section 77, connected to each of likelihood adding section 74, flag detecting section 75 and memory 76, makes a judgement as to whether the flag content detected by flag detecting section 75 relates to the control channel (FACCH) data or not.

A mode judging section 78 is connected to input terminal 72 and makes a judgement as to whether the reception mode is an exclusive mode for the control channel (FACCH) data or not.

A channel decoding section 79, connected to each of the likelihood adding section 74, FACCH judging section 77, and mode judging section 78, executes a switching operation for selecting either an FACCH decoding section or a TCH/CCH decoding section in accordance with the outputs of FACCH judging section 77 and mode judging section 78, thereby channel decoding the signal sent from likelihood adding section 74 which is corrected in equalizing section 73 to eliminate distortion or the like and is added the likelihood signal in likelihood adding section 74. Then, the signal thus channel decoded is output from an output terminal 710.

Next, an operation of the above-described seventh embodiment will be explained. In this seventh embodiment, when the reception signal is entered through input terminal 71, equalizing section 73 corrects the reception signal to eliminate the distortion or the like thereof and generates an equalized output signal. Likelihood adding section 74 adds a predetermined likelihood bit by bit to the reception signal sent from the equalizing section 74.

Flag detecting section 75 detects the flag (information bit) indicating the control channel (FACCH) data from the reception signal when the reception signal is sent from the likelihood adding section 74, about several frames designated by the decoding frame unit.

FACCH judging section 77 sums up the likelihood corresponding to the flag (information bit) when the content of the flag (information bit) detected by flag detecting section 75 involves the control channel (FACCH) data, and subtracts the likelihood corresponding to the flag (information bit) from the sum-up value when the content of the flag (information bit) does not involve the control channel (FACCH) data. Then, FACCH judging section 77 identifies the received radio channel as control channel (FACCH) when the sum-up value exceeds the threshold value stored in memory 76, and otherwise as another channel.

On the other hand, based on the control signal entered from input terminal 72, mode judging section 78 makes a judgement as to whether the reception mode is the exclusive channel for the control channel (FACCH) data. When the reception mode is judged to be the exclusive channel for the control channel (FACCH) data, mode judging section 78 generates a switching signal for establishing a signal transmission path directly sending the output signal of likelihood adding section 74 to the FACCH decoding section of channel decoding section 79 by bypassing the flag detecting section 75 and FACCH judging section 77. Thus, the reception signal, after passing the likelihood adding section, is FACCH decoded. On the other hand, when the reception mode is judged to be not the exclusive channel for the control channel (FACCH) data, mode judging section 78 generates another switching signal for establishing a signal transmission path sending the output signal of likelihood adding section 74 to the channel decoding section 79 through flag detecting section 75 and FACCH judging section 77. Channel decoding section 79 performs the channel decoding operation based on the judgement result of FACCH judging section 77 or mode judging section 78. Then, the signal thus channel decoded is output from output terminal 710.

In this manner, the seventh embodiment of the present invention omits the unnecessary processing in advance and uses the information conventionally used nevertheless makes it possible to perform the channel decoding operation accurately without increasing the processing or computation amount compared with the conventional method of judging the control channel (FACCH) data which basically uses Viterbi algorithm in response to each demodulation timing signal. More specifically, the seventh embodiment can omit the unnecessary processing as well as the detection of flag and the judgement processing, when it is known beforehand that the reception mode is the exclusive mode for the control channel.

As apparent from the foregoing description, the present invention utilizes the information available from the function conventionally existing and makes it possible to accurately detect the control channel (FACCH) data without increasing the processing or computation amount.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

What is claimed is:

1. A data receiving system comprising:

equalizing means for correcting a reception signal to eliminate distortion and generating an equalized output signal;

detecting means for detecting a flag within a predetermined decoding unit which is a minimum unit necessary for decoding received control channel (FACCH) data, when said flag indicates the identity of said control channel (FACCH) data involved in said equalized output signal; and control channel (FACCH) detecting means for calculating the probability that each flag indicates the identity of said control channel (FACCH) data using likelihood information of equalized data, and then identifying a received radio channel as a control channel (FACCH) when the probability thus calculated is larger than a predetermined judgement discriminating value, and identifying said received radio channel as another channel other than said control channel (FACCH) when said probability is smaller than said judgement discriminating value.

2. A data receiving system comprising:

equalizing means for correcting a reception signal to eliminate distortion and generating an equalized output signal;

detecting means for detecting a flag within a predetermined decoding unit which is a minimum unit necessary for decoding received control channel (FACCH) data, when said flag indicates the identity of said control channel (FACCH) data involved in said equalized output signal; and control channel (FACCH) detecting means for identifying a received radio channel as a control channel (FACCH) when the number of flags thus detected is larger than a first judgement discriminating value and identifying said received radio channel as another channel other than said control channel (FACCH) when said number of flags is smaller than a second judgement discriminating value, said control channel (FACCH) detecting means calculating the probability of each flag identifying a control channel in a decoding unit using likelihood information of equalized data when said number of flags is somewhere between said first and second judgement discriminating values, and then identifying a received radio channel as the control channel (FACCH) when the probability thus calculated is larger than a third judgement discriminating value and identifying said received radio channel as another channel other than said control channel (FACCH) when said probability is smaller than said third judgement discriminating value.

3. A data receiving system comprising:

equalizing means for correcting a reception signal to eliminate distortion and generating an equalized output signal;

detecting means for detecting a flag within a predetermined decoding unit which is a minimum unit necessary for decoding received control channel (FACCH) data, when said flag indicates the identity of said control channel (FACCH) data involved in said equalized output signal;

control channel (FACCH) detecting means for calculating the probability of each flag being in the decoding unit using likelihood information of equalized data, and then identifying a received radio channel as a control channel (FACCH) when the probability thus calculated is larger than a predetermined judgement discriminating value and identifying said received radio channel as another channel other than said control channel (FACCH) when said probability is smaller than said judgement discriminating value; and bypassing means for establishing a signal transmission path bypassing said detecting means and the control channel (FACCH) detecting means, whereby the reception signal is decoded as a control channel (FACCH) data without being subjected to the processing for detecting the flag and judging the received radio channel when a reception mode is known beforehand as an exclusive mode for receiving the control channel (FACCH).

* * * * *